United States Patent
Kranzley

(10) Patent No.: US 7,735,733 B2
(45) Date of Patent: Jun. 15, 2010

(54) MULTIPLE ACCOUNT WIRELESS PAYMENT DEVICE

(75) Inventor: Arthur D. Kranzley, Pound Ridge, NY (US)

(73) Assignee: Mastercard International, Inc., Purchase, NY (US)

(*) Notice: Subject to any disclaimer, the term of this patent is extended or adjusted under 35 U.S.C. 154(b) by 502 days.

(21) Appl. No.: 11/777,390

(22) Filed: Jul. 13, 2007

(65) Prior Publication Data

US 2008/0021824 A1    Jan. 24, 2008

Related U.S. Application Data

(60) Provisional application No. 60/831,355, filed on Jul. 17, 2006.

(51) Int. Cl.
*G06K 7/00* (2006.01)

(52) U.S. Cl. ............................ 235/439; 235/492

(58) Field of Classification Search ............ 235/380, 235/439, 492
See application file for complete search history.

(56) References Cited

U.S. PATENT DOCUMENTS

| | | | |
|---|---|---|---|
| 5,193,114 A | 3/1993 | Moseley | |
| 5,276,311 A | 1/1994 | Hennige | |
| 5,585,787 A | 12/1996 | Wallerstein | |
| 5,955,961 A | 9/1999 | Wallerstein | |
| 6,024,286 A | 2/2000 | Bradley et al. | |
| 6,145,739 A | 11/2000 | Bertina et al. | |
| 6,315,195 B1 | 11/2001 | Ramachandran | |
| 6,353,811 B1 | 3/2002 | Weissman | |
| 6,631,849 B2 | 10/2003 | Blossom | |
| 6,693,513 B2 | 2/2004 | Tuttle | |
| 6,715,679 B1 | 4/2004 | Infosino | |
| 6,764,005 B2 | 7/2004 | Cooper | |
| 6,863,220 B2 | 3/2005 | Selker | |
| 7,100,835 B2 * | 9/2006 | Selker | ............ 235/492 |
| 2002/0029191 A1 | 3/2002 | Ishibashi et al. | |
| 2002/0095386 A1 | 7/2002 | Maritzen et al. | |
| 2004/0251303 A1 | 12/2004 | Cooper | |
| 2006/0267737 A1 * | 11/2006 | Colby | ............ 340/10.51 |

* cited by examiner

*Primary Examiner*—Seung H Lee
(74) *Attorney, Agent, or Firm*—Buckley, Maschoff & Talwalkar LLC

(57) ABSTRACT

A payment device includes an integrated circuit (IC) to store at least two account numbers. The payment device also includes an antenna coupled to the IC to selectively transmit a selected one of the account numbers. The IC includes at least three terminals by which the IC is coupled to the antenna and to at least one other device.

10 Claims, 4 Drawing Sheets

MULTIPLE ACCOUNT WIRELESS PAYMENT DEVICE

CROSS-REFERENCE TO RELATED APPLICATIONS

The present application is a continuation of U.S. Provisional Application No. 60/831,355 filed Jul. 17, 2006 and entitled "MULTIPLE ACCOUNT WIRELESS PAYMENT DEVICE."

BACKGROUND

Many holders of payment cards (credit and/or debit cards) find to their inconvenience that they wish to carry several such cards at the same time, potentially leading to overcrowding of the limited space in the holders' wallets. Among other proposed solutions, it has been proposed (e.g., in U.S. Pat. No. 6,631,849, issued to Blossom) to alleviate this problem with payment cards that carry two or more magnetic stripes, where each of the magnetic stripes is used to access a respective payment card account. This same problem potentially exists with respect to proximity payment devices, of which one example is the "PayPass"® card distributed by MasterCard International Incorporated, the assignee hereof. However there has been to date little or no detailed consideration of how to configure a proximity payment device to allow the user to access more than one account with a single device.

DETAILED DESCRIPTION

In general, and for the purpose of introducing concepts of embodiments of the present invention, a proximity payment device, such as a wireless payment card, may include a wireless payment card IC that stores two or more different account numbers. The IC has at least three terminals (e.g., five terminals) that provide connections between the IC and (a) an antenna and (b) at least one other device (e.g., a pair of switches to allow the user to select among the different account numbers). At a time when the proximity payment device is in proximity to and interrogated by a suitably equipped point-of-sale (POS) terminal: (i) actuation of one of the switches turns on the proximity payment device and causes the proximity payment device to transmit one of the account numbers to the POS terminal; whereas (ii) actuation of the other or another of the switches turns on the proximity payment device and causes the proximity payment device to transmit a different account number to the POS terminal. For example, the same proximity payment device may be used to selectively access either a credit card account or a debit card account.

Figure 1:
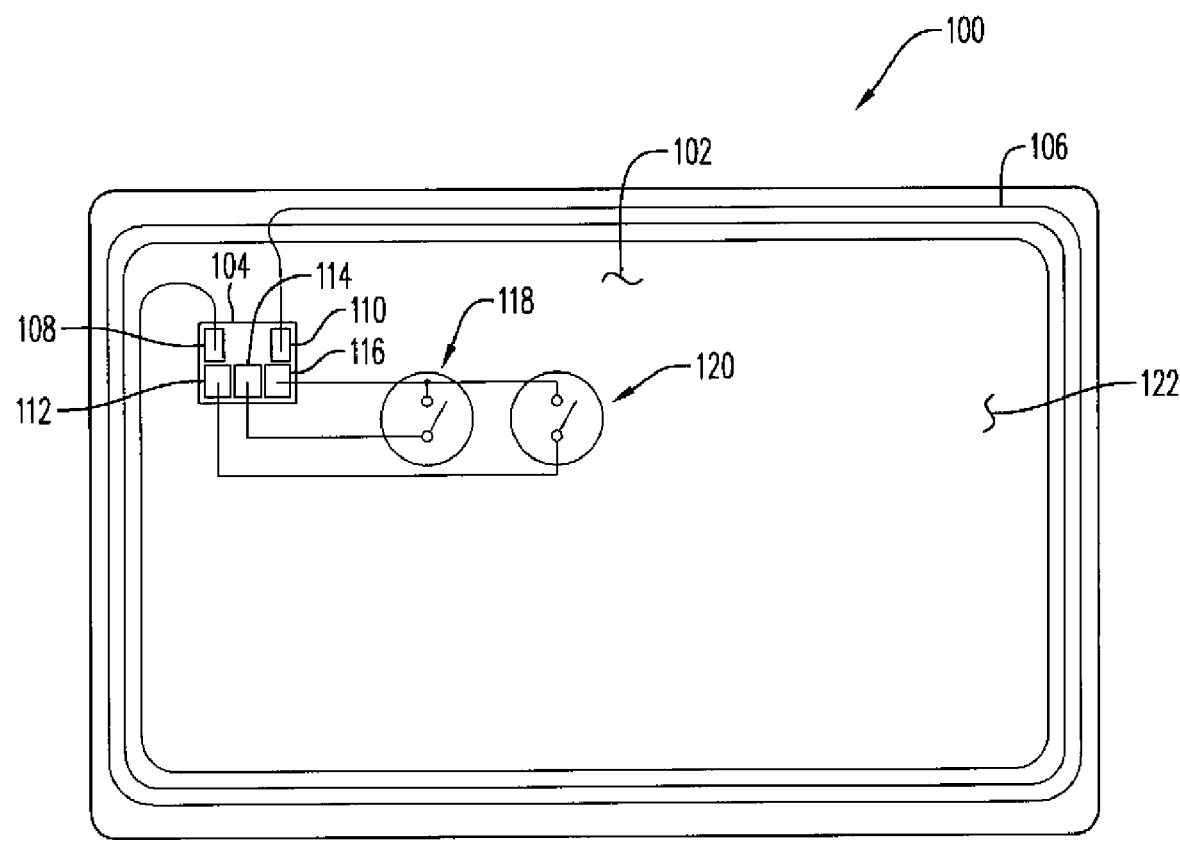
FIG. 1 is a schematic plan view of a proximity payment device according to some embodiments.

FIG. 1 is a schematic plan view of a proximity payment device 100 according to some embodiments. The proximity payment device 100 may include a card-shaped body 102, which may resemble conventional payment cards in shape and size. The card-shaped body 102 may be formed of plastic or another suitable material.

The proximity payment device 100 may also include an integrated circuit (IC) 104 that is mounted in or on (e.g., embedded in) the card-shaped body 102. The IC 104 may be suitably designed and configured to transmit payment card account information by radio frequency signaling to a POS terminal, as will be discussed further below. The IC 104 may include a register or registers or other storage device or devices (not separately shown) to store two or more payment card account numbers. In general, the IC may be designed and configured to operate in accordance with the "PayPass" standard promulgated by MasterCard International Incorporated, the assignee hereof.

The proximity payment device 100 may further include an antenna 106 embedded in or otherwise mounted on the card-shaped body 102. As shown, the antenna 106 may be in the form of several loops arranged along the periphery of the card-shaped body. Alternatively, the antenna 106 may be of a different type and/or configuration. The antenna may be operative generally in accordance with the above-mentioned PayPass standard to receive interrogation and power signals (which may be the same signal) from a proximity coupling device (discussed below) of a POS terminal and to transmit payment card account number information and/or other information to the proximity coupling device.

In the particular embodiment shown in FIG. 1, the IC 104 has five connection terminals 108, 110, 112, 114 and 116. The antenna 106 may be coupled to the IC 104 via terminals 108, 110, each coupled to a respective end of the antenna 106. In other embodiments, the number of connection terminals of the IC 104 may be more or fewer than the number shown in FIG. 1.

The proximity payment device 100 may also include switches schematically shown at 118, 120 and mounted in or on the card-shaped body 102 at a front surface 122 of the card-shaped body 102. As previously suggested, the switches 118, 120 may be actuated by a user of the proximity payment device 100 to turn on (activate) the proximity payment device and/or to select among the payment card account numbers stored in the IC 104. Both of the switches 118, 120 may be normally-open (i.e. in an open state unless actuated by the user). One or more of the finger- or thumb-actuatable mechanical contact switches disclosed in U.S. Pat. No. 6,863,220 (issued to Selker) may be suitable for use as the switches 118, 120. Alternatively, one or more of the switches 118, 120 may be a membrane switch. In other embodiments, one or more of the switches 118, 120 may include a respective pressure detector (not shown) to detect actuation by the user's finger or thumb. Other types of switches may alternatively be employed.

The switch 118 may be coupled to the IC 104 via the terminal 114 of the IC 104. The switch 120 may be coupled to the IC 104 via the terminal 112 of the IC 104. In addition, the switches 118, 120 may be coupled in common to the IC 104 via the terminal 116 of the IC 104. Thus terminal 112 may be coupled to switch 120; terminal 114 may be coupled to switch 118; and terminal 116 may be coupled in common to switches 118, 120.

In some embodiments, lettering (not shown) or other symbols (not shown) may be present on the front surface 122 and/or on the rear surface (not shown) of the card-shaped body 102. For example, the legend "Debit" may be present on or near the location of one of the switches 118, 120 to indicate that the respective switch provides access to the holder's debit card account, and the legend "Credit" may be present on or near the location of the other one of the switches to indicate that the respective switch provides access to the holder's credit card account. The proximity payment device 100 may have one or more magnetic stripes (not shown) to allow the proximity payment device 100 to be read by a magnetic card reader and/or there may be embossed numbers and/or letters on the card-shaped body 102 to indicate one or more account numbers and/or the name of the holder of the proximity payment device 100. In addition or alternatively, non-embossed printing on the front surface 122 may indicate the account numbers and/or the holder's name. In addition, the front surface 122 of the card-shaped body 102 may carry one or more logos and/or brands, including, for example, the brand/logo of a national payment card association such as MasterCard International Incorporated. The brand/logo of the issuer may also be present, as well as, for example, a specific card product brand. Other conventional features that may be present on the proximity payment device 100 (though such features are not shown) are an adhesive paper strip to receive the signature of the cardholder, and a security code or the like printed on the adhesive strip.

Figure 2:
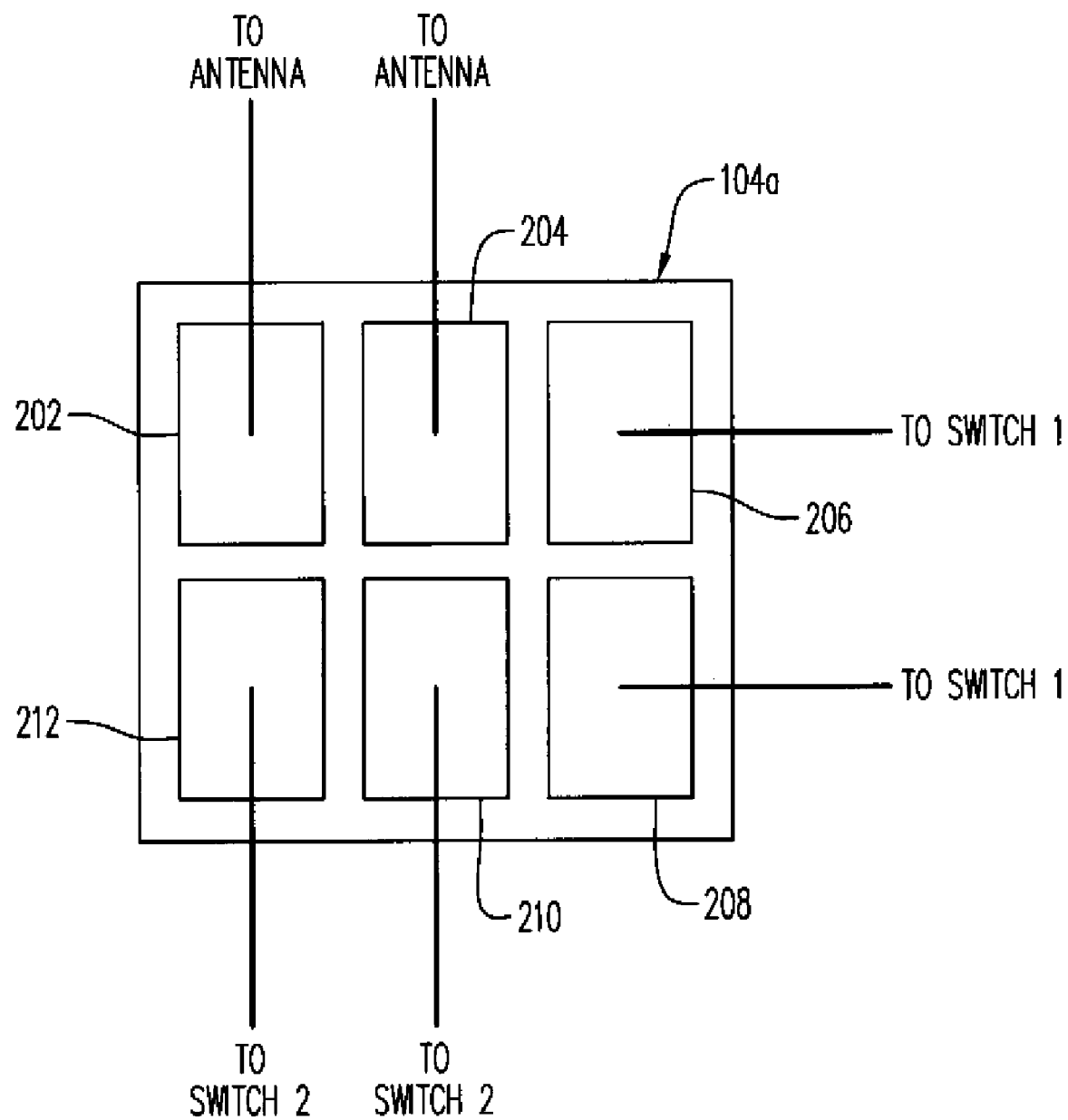
FIG. 2 is a schematic view on a larger scale showing a wireless payment card integrated circuit (IC) and related connections provided in accordance with an alternative embodiment of the proximity payment device.

FIG. 2 is a schematic view on a larger scale than FIG. 1, showing a wireless payment card IC 104a that may be used in an alternative embodiment of the proximity payment device 100 in place of the IC 104 shown in FIG. 1. The IC 104a of FIG. 2 may differ from the IC 104 of FIG. 1 principally in that the IC 104a may have six connection terminals 202, 204, 206, 208, 210, 212 rather than the five connection terminals 108, 110, 112, 114, 116 shown in FIG. 1. As indicated in FIG. 2, the terminals 202, 204 may be coupled to the antenna (not shown in FIG. 2, element 106 in FIG. 1); the terminals 206, 208 may be coupled to one of the switches, e.g., switch 118 (FIG. 1, not shown in FIG. 2); and the terminals 210, 212 may be coupled to the other one of the switches, e.g., switch 120 (FIG. 1, not shown in FIG. 2). It will be appreciated that the architecture of the proximity payment device (not separately shown) in which the IC 104a is utilized may differ from the architecture of the proximity payment device 100 of FIG. 1 principally in that in the former each of the two switches has its own two connections to the IC 104a, whereas in the latter the two switches have a common connection to the IC 104 in addition to each having its own separate connection to the IC 104.

Figure 3:
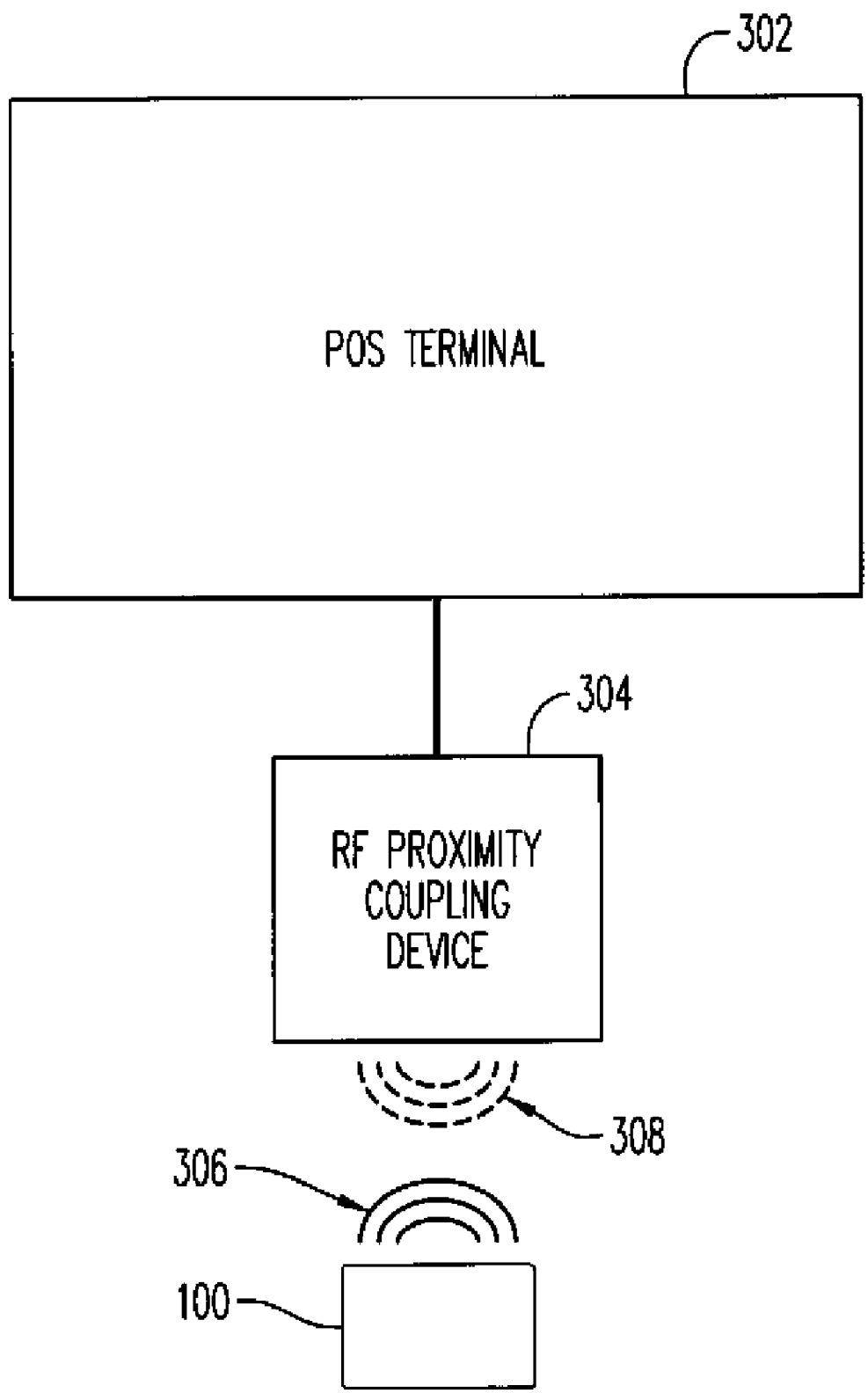
FIG. 3 is a block diagram showing a transaction between a proximity payment device and a point of sale terminal.

FIG. 3 is a block diagram showing a purchase transaction between the proximity payment device 100 and a point of sale terminal 302. The POS terminal 302 may have and/or be coupled to a conventional RF proximity coupling device 304. The proximity coupling device 304 may, for example, operate in accordance with the above-mentioned PayPass standard to interrogate, and receive account information from, proximity payment devices. In FIG. 3, reference numeral 306 indicates an account information wireless signal sent from the proximity payment device 100 to the proximity coupling device 304 in response to an interrogation signal 308 (shown in phantom) transmitted from the proximity coupling device 304. In a conventional manner, the payment account number included in the signal 306 may be transmitted/processed by the POS terminal 302 so that the account represented by that account number is used to pay for the purchase transaction illustrated in FIG. 3.

Figure 4:
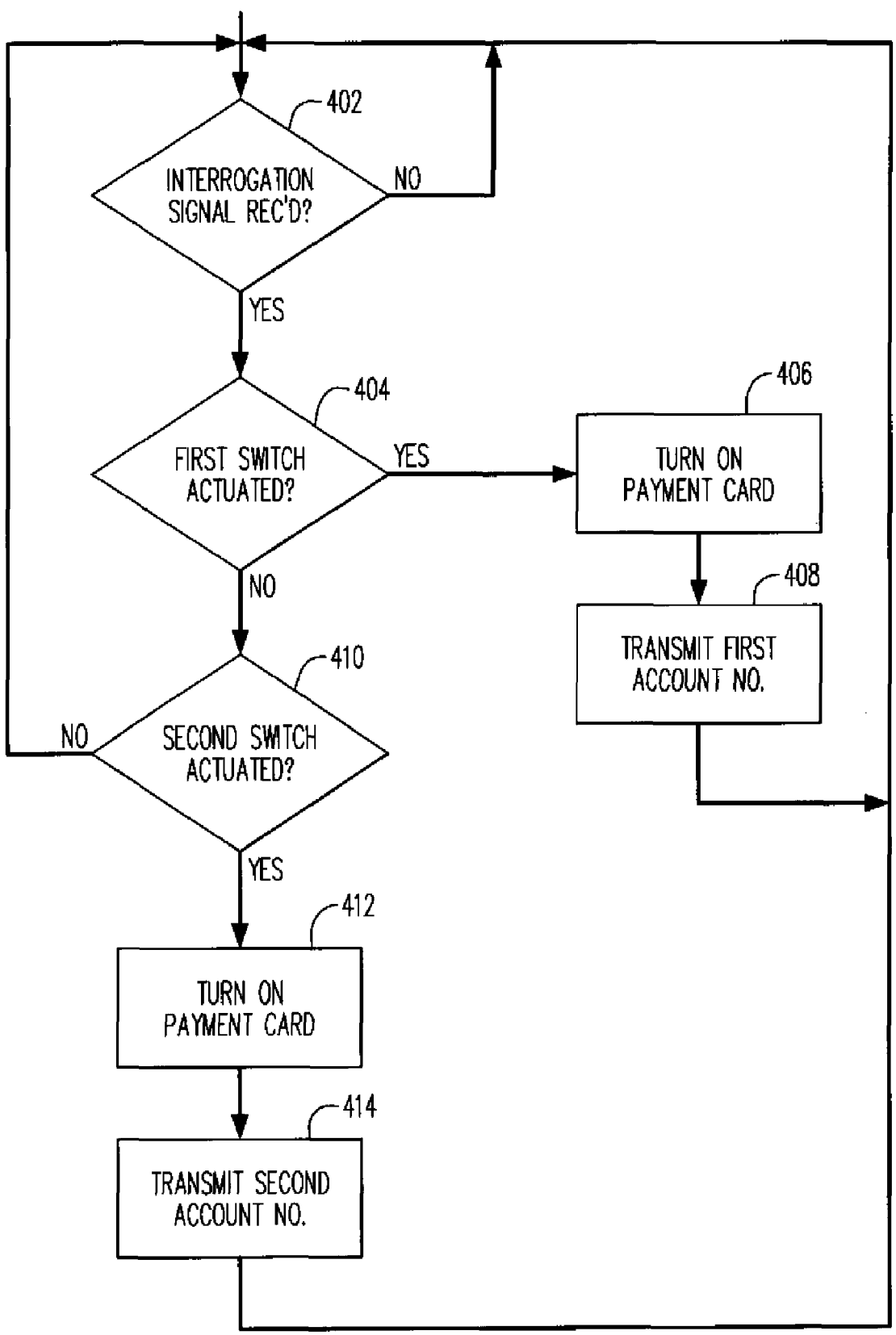
FIG. 4 is a flow chart that illustrates a process that may be performed by the proximity payment device of FIG. 1.

FIG. 4 is a flow chart that illustrates a process that may be performed by the proximity payment device 100.

At 402 in FIG. 4, it is determined whether the proximity payment device has received an interrogation signal (i.e., by being brought into proximity to a proximity coupling device). If not, the process of FIG. 4 idles. If the proximity payment device has received/is receiving the interrogation signal, it is next determined at 404 whether the switch 118 has been actuated (e.g., by being pressed by the user's finger). If so, then the proximity payment device is turned on (406) and the account number stored in IC 104 and corresponding to switch 118 is transmitted (408) via the antenna 106 from the proximity payment device 100 to the proximity coupling device 304. In effect, actuation of the switch 118 at a time when the proximity payment device is being interrogated turns on the proximity payment device and selects one of the account numbers stored in the IC 104. For example, if a legend "debit" is printed on the card-shaped body 102 at switch 118, then the account number selected by actuation of the switch 118 may correspond to the user's debit card account.

If it is determined at 404 that switch 118 has not been actuated, it may next be determined at 410 whether switch 120 has been actuated (e.g., by being pressed by the user's finger). If so, then the proximity payment device is turned on (412) and the account number stored in IC 104 and corresponding to switch 120 is transmitted (414) via the antenna 106 from the proximity payment device 100 to the proximity coupling device 304. Thus actuation of the switch 120 at a time when the proximity payment device is being interrogated turns on the proximity payment device and selects one of the account numbers stored in the IC 104. For example, if a legend "credit" is printed on the card-shaped body 102 at switch 120, then the account number selected by actuation of the switch 120 may correspond to the user's credit card account.

Giving further consideration to the process illustrated in FIG. 4, it will be appreciated that on a first occasion the user of the proximity payment device may bring the proximity payment device into proximity with the proximity coupling device belonging to a first POS terminal at a first location (e.g., a first retail store). On that occasion the user may actuate switch 118 to select, e.g., the user's debit card account number for transmission from the proximity payment device to the first POS terminal. The user's debit card account is accordingly used for the purchase transaction on the first occasion. Later, on a second occasion, the user may bring the proximity payment device into proximity with the proximity coupling device belonging to a second POS terminal at a second location (e.g., a second retail store). On the second occasion the user may actuate switch 120 to select the user's credit card account number for transmission from the proximity payment device to the second POS terminal. The user's credit card account is therefore used for the purchase transaction on the second occasion.

A proximity payment device like that disclosed herein may be doubly convenient for the user, in that it need not be interfaced by contact to the POS terminal, and it may provide access to two or more accounts, thereby potentially reducing the number of payment cards or the like that the user carries. The accounts accessed via the proximity payment device need not be credit and/or debit accounts, but rather may be any two accounts of the same or different types such as are customarily accessed, controlled and/or identified by use of payment cards, proximity payment devices, magnetic stripe cards, barcode cards, etc. The proximity payment device need not be card-shaped and/or need not be of the same size and shape as standard payment cards.

The proximity payment device may be, e.g., a "passive" RFID device in that it has no source of power other than from a power signal received from a terminal device that interrogates the proximity payment device. In addition or alternatively, the proximity payment device may include a battery power source, which is not shown, and/or may be powered by direct power contacts (not shown) interfaced to the interrogating terminal.

The above description and/or the accompanying drawings are not meant to imply a fixed order or sequence of steps for any process referred to herein; rather any process may be performed in any order that is practicable, including but not limited to simultaneous performance of steps indicated as sequential.

One or both of the switches shown herein may be normally-closed rather than normally open. The number of switches on the proximity payment devices may be more or fewer than the two switches explicitly shown. The term "switch" refers to any manually actuatable device for registering a change of state. The term "actuation" or related words need not necessarily imply movement of one part of a switch relative to another part of the switch.

The term "mounted in or on" includes the state of being fully or partially encapsulated or embedded in an object.

The term "turning on" means enabling a proximity payment device to transmit a signal. In some embodiments described herein, in essence two simultaneous events are required to turn on the proximity payment device, namely receipt of an interrogation signal, which may be the source of power for the device, and actuation of one of the switches, with the latter event also selecting one or two or more account numbers. Each of these events may be necessary, but not sufficient, to turn on the proximity payment device. The action of actuating one of the switches has the purpose and effect, in suitable circumstances, of turning on the payment card and also selecting an account to be used for the current payment transaction. An action may be considered to result in "turning on" a device if it is either necessary or sufficient for enabling the proximity payment device to respond to an interrogation signal.

In some embodiments, receipt of an interrogation signal is alone sufficient to turn on the proximity payment device, with the actuation of a switch on the proximity payment device operating only to select from among account numbers stored in the IC on the proximity payment device. For example, in some embodiments, only a single switch is provided, the proximity payment device transmits one account number if interrogated at a time when the switch is actuated, and the proximity payment device transmits a different account number if interrogated at a time when the switch is not actuated. In still other embodiments, a second switch may be provided to select a third account number for transmission.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A payment device, comprising:
   an integrated circuit (IC) to store at least two account numbers; and
   an antenna coupled to the IC to selectively transmit a selected one of the account numbers;
   wherein the IC includes at least three terminals by which the IC is coupled to the antenna and to at least one other device;
   wherein:
   the at least one other device includes two switches for selecting between said account numbers; and
   the IC includes five terminals, including:
      a first terminal coupled to the antenna;
      a second terminal coupled to the antenna;
      a third terminal coupled in common to the two switches;
      a fourth terminal coupled to a first one of the two switches; and
      a fifth terminal coupled to a second one of the two switches.

2. The payment device of claim 1, wherein each of the switches is operative both to activate the payment device and to select a respective one of said account numbers for transmission.

3. The payment device of claim 1, wherein each of the switches is a normally-open mechanical switch.

4. The payment device of claim 3, wherein each of the switches is a membrane switch.

5. The payment device of claim 1, wherein each of said switches includes a respective pressure detector.

6. A payment device, comprising:
   a card-shaped body;
   an antenna embedded in the card-shaped body and arranged along a periphery of the card-shaped body;
   an integrated circuit (IC) embedded in the card-shaped body and coupled to the antenna by a first terminal of the IC and a second terminal of the IC;
   a first switch at a front surface of the card-shaped body and coupled to the IC by a third terminal of the IC and a fourth terminal of the IC; and
   a second switch at the front surface of the card-shaped body and coupled to the IC by a fifth terminal of the IC and the fourth terminal of the IC.

7. The payment device of claim 6, wherein the IC is operative to:
   transmit a first account number via the antenna in response to occurrence of both of (a) receiving an interrogation signal and (b) the first switch being actuated; and
   transmit a second account number via the antenna in response to occurrence of both of (a) receiving the interrogation signal and (b) the second switch being actuated.

8. The payment device of claim 6, wherein the first and second switches are normally-open mechanical switches.

9. The payment device of claim 8, wherein the first and second switches are membrane switches.

10. The payment device of claim 6, wherein each of said switches includes a respective pressure detector.

* * * * *